United States Patent [19]

Cheadle et al.

[11] Patent Number: 4,497,364
[45] Date of Patent: Feb. 5, 1985

[54] LAYERED SOLID CORROSION INHIBITORS FOR USE IN CORRODIBLE DEVICES FOR AUTOMATIC ADDITION TO COOLANT SYSTEMS

[75] Inventors: Brian E. Cheadle, Bramalea; Gordon J. Lee, Mississauga, both of Canada

[73] Assignee: Long Manufacturing Ltd., Ontario, Canada

[21] Appl. No.: 415,115

[22] Filed: Jan. 3, 1983

[51] Int. Cl.³ .............................................. F28F 19/00
[52] U.S. Cl. .................................... 165/134 R; 222/54
[58] Field of Search ........................ 165/1, 12, 134 R; 137/67, 268; 206/524.5; 222/54; 428/330, 934; 252/74, 75

[56] References Cited

U.S. PATENT DOCUMENTS 4,333,516 6/1982 Krueger et al. ......................... 165/1
4,347,895 9/1982 Zambrow ............................... 222/54
4,357,236 11/1982 Krueger ................................ 222/54

Primary Examiner—Douglas Hart

[57] ABSTRACT

A solid anhydrous composition comprising a surface layer formed of a caustic compound and a second layer formed of a corrosion inhibiting compound for use in a corrodible container in a device for the automatic addition of corrosion inhibitors to coolant systems. Where corrosive water is present in the coolant system in contact with the corrodible portion of the container, perforation of the corrodible portion allows penetration of coolant into the container, forming a highly corrosive alkaline solution in the area of perforation, quickly destroying the remaining corrodible portion and allowing rapid disolution and dispersion of the solid corrosion inhibitor.

5 Claims, 3 Drawing Figures

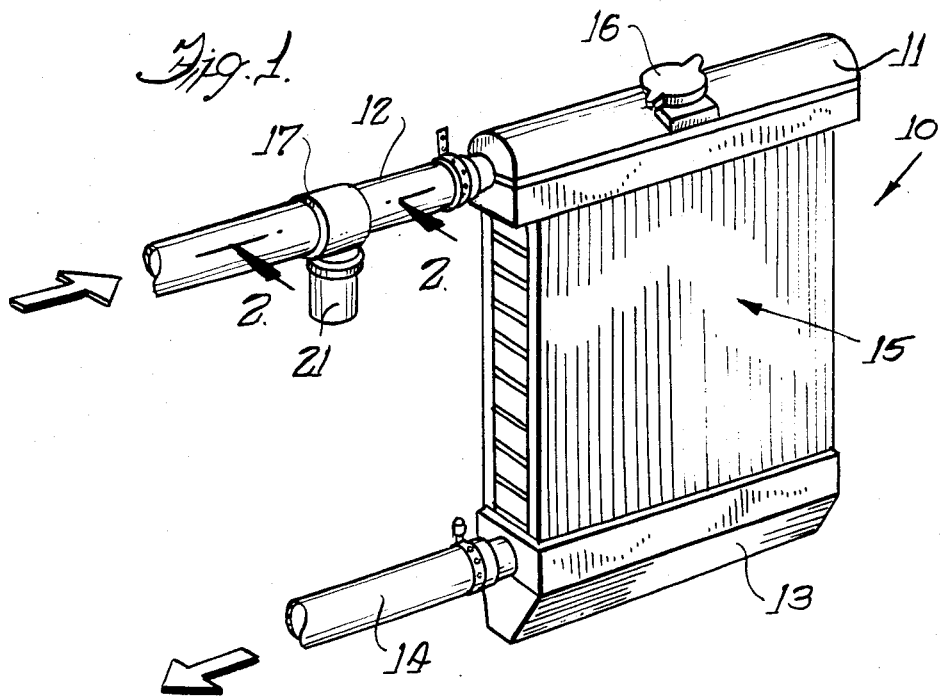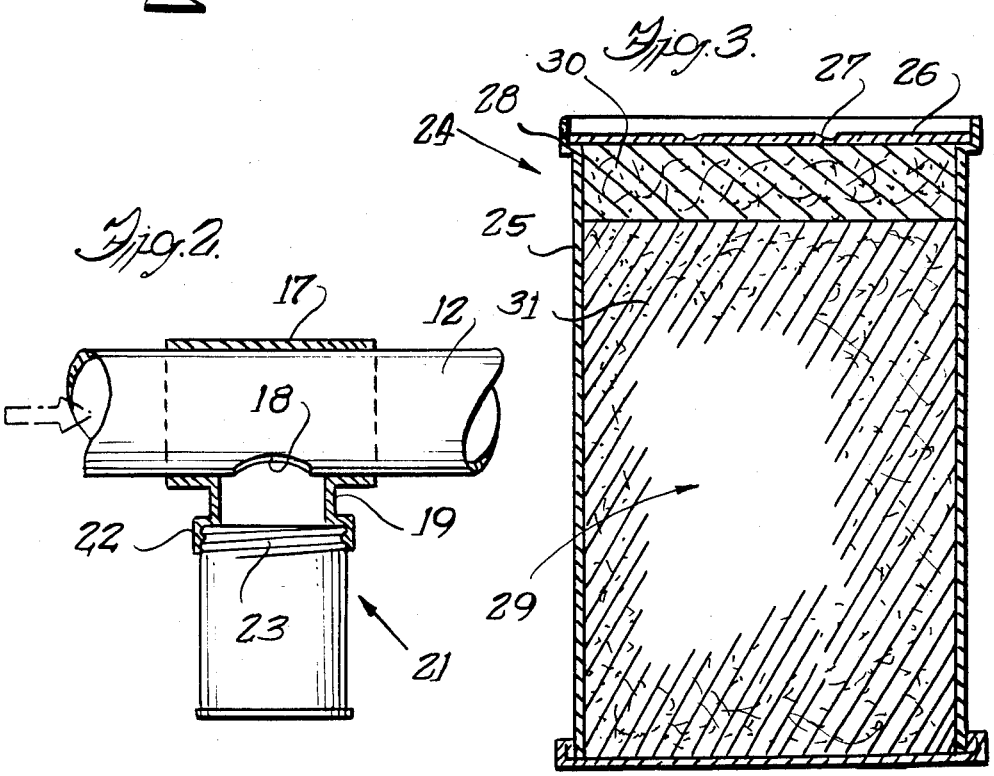

LAYERED SOLID CORROSION INHIBITORS FOR USE IN CORRODIBLE DEVICES FOR AUTOMATIC ADDITION TO COOLANT SYSTEMS

BACKGROUND OF THE INVENTION

This invention relates to corrosion inhibitors suitable for inhibiting the corrosion of aluminum and aluminum alloys, and to a method for protecting the surfaces of aluminum and aluminum alloys against attack by corrosive aqueous media. More particularly, the invention relates to improved solid corrosion inhibitor compositions comprising a caustic compound and at least one soluble corrosion inhibitor for use with corrodible devices for automatic addition of corrosion inhibitors to coolant systems. The invention is particularly useful in preventing corrosion in aluminum radiators used in the cooling systems of internal combustion engines.

Engine coolants for the cooling system of an automotive vehicle usually contain ethylene glycol and a small percentage of diethylene gylcol. This fluid is diluted with water to provide a 50% or lower concentration of glycol depending on the desired freezing point for the coolant system. Most companies that manufacture and/or distribute ethylene glycol for coolant systems add corrosion inhibitors to the solution to prevent corrosion of the copper-brass traditionally used in the manufacture of vechicle radiators.

These inhibitors usually are a mixture of one or more inorganic salts, such as phosphates, borates, nitrates, nitrites, silicates or arsenates, and an organic compound, such as benzothiazole, tolylthiazole or mercaptobenzothiazole, to prevent copper corrosion. The solution is generally buffered to a pH of 8 to 10 to reduce iron corrosion and to neutralize any glycolic acid formed in the oxidation of ethylene glycol. Most companies recommend a maximum of one or two years' service for their antifreeze coolant, however, it has been found that the average car owner does not follow the owner's instruction manual to maintain $-20°$ F. protection for the coolant system and does not check the coolant to determine if it is rusty or dirty. Many owners only add water when the antifreeze is lost through leakage or hose breakage. This is more likely to occur in the southern part of the country than in northern areas.

In normal passenger car service, 25% of the cars require coolant system servicing after only one year; after two years this percentage rises to 50%. With normal copper-brass radiators, and even more so with aluminum systems, it is extremely important that the antifreeze or coolant mixture contain 50 to 55% of the correctly inhibited ethylene glycol. A reduction to a mixture of 33% ethylene glycol—67% water will increase metal corrosion significantly. This is especially important with higher temperature coolant systems which are becoming more common with the increased use of emission controls.

Also, with the increasing emphasis on gas mileage of the new automobiles, cars are being downsized and reduced in weight through the substitution of lightweight metals or plastics for iron and steel where practical. In the automotive coolant systems, aluminum radiators are being utilized instead of the conventional copper-brass radiators previously used. As above noted, an aluminum radiator is more susceptible to the corrosive action of a coolant or antifreeze that is low in the percentage of ethylene glycol and/or where an insufficient amount of corrosion inhibitor is present in the coolant. In such a system, additional corrosion inhibitor must be added or the aluminum will begin to corrode by pitting at a rapid rate.

Devices for automatically adding corrosion inhibitor to the system are known in the art. One such system, disclosed in U.S. Pat. No. 4,333,516 provides a container having a corrodible portion and filled with corrosion inhibitor. As the coolant becomes corrosive, the container corrodes and is quickly penetrated. Because the corrodible portion of the container is considerably thinner than the material forming the radiator, penetration will occur well before significant attack on the radiator can occur. Once penetration is achieved, the coolant will dissolve or disperse the inhibitor into the coolant system and stop or retard further corrosion. Where solid inhibitors are employed, the rapidity with which further corrosion will be inhibited will depend in part upon the speed with which the solid inhibitor can be dissolved. To speed the dissolution of the inhibitor, resort may be had to means for destroying the corrosion-weakened portion of the container such as the use of internal springs or the use of compositions which expand upon hydration. This in turn greatly increases the exposure of the solid inhibitor to the coolant and hastens the dissolution thereof.

As further aid to rapid dispersion and dissolution, it is generally better practice to employ dry, granulated or powdered corrosion inhibitors. However, as a practical matter, it would be desirable to provide the solid corrosion inhibitor in a compressed or tightly compacted form in order to reduce the size of the container and to maximize the amount of corrosion inhibitor that can be included therein. Speeding the destruction of the corrodible portion of the container after penetration by coolant to enhance the rate of dissolution becomes very important where the corrosion inhibitor is a compacted or compressed solid.

SUMMARY OF THE INVENTION

This invention relates to an improved solid corrosion inhibitor charge for use in a device for automatic addition of corrosion inhibitor into a coolant system and to an improved method for adding corrosion inhibitor to a coolant system.

DESCRIPTION OF THE DRAWINGS

FIG. 1 is a perspective view of an automobile radiator showing one method of positioning a corrosion inhibitor container in cooperation therewith.

FIG. 2 is an enlarged side elevational view partially in cross section showing the mounting for the container taken on the line 2—2 of FIG. 1.

FIG. 3 is a cross sectional view of a container for corrosion inhibitor, showing the solid corrosion inhibitor charge of this invention.

DETAILED DESCRIPTION OF THE PERFERRED EMBODIMENTS

The corrosion inhibitor composition suitable for use in the practice of this invention comprises at least one caustic compound and at least one corrosion inhibiting compound. The caustic compound is an anhydrous compound which in the absence of water does not attack aluminum. The corrosion inhibiting compound may be one or more of the common corrosion inhibitors, including the soluble salts selected from the group consisting of nitrates, nitrites, chromates, sulfates, silicates, phosphates, borates, and arsenates, as well as thiazoles such as benzothiazole, tolylthiazole, or mercaptobenzothiazole. Particularly useful are the alkali metal salts such as for example, lithium nitrate, sodium chromate, disodium hydrogen phosphate and the like.

The caustic compound may be a soluble, solid caustic such as for example an alkali or alkaline earth metal hydroxide or oxide like sodium hydroxide, calcium oxide or the like. Also useful are alkaline salts of alkali metals such as disodium hydrogen phosphate, trisodium phosphate, sodium meta- or tetraborate, sodium silicate or the like which when dissolved in water at high concentration form a strongly alkaline solution which is corrosive to aluminum. It will be recognized that many of these salts are also corrosion inhibitors for aluminum when present in water in low concentrations, hence may be preferred over caustics such as alkali metal hydroxides.

The corrosion inhibitor compositions of this invention are solids and are formed by compressing the powdered or granular components in a cavity mold shaped to provide a properly sized charge to fit the corrodible container. Although the composition may be formed by mixing the components and compressing the mixture to form the charge, it is preferred that the composition be formed in layers such that the alkaline or caustic component forms the surface of the charge. It is essential that the composition be solid and completely anhydrous and be protected from moisture or other source of water prior to being sealed in the dry corrodible container in order to prevent premature corrosion of the container.

Referring now to the drawings, wherein there is shown a Prior Art device for automatic addition of corrosion inhibitor to the coolant system for an automobile, FIG. 1 discloses an automobile radiator 10 for the coolant system of the vehicle engine (not shown). The radiator includes an inlet tank 11 having an inlet hose 12 communicating therewith, an outlet tank 13 with an outlet hose 14 extending therefrom, and a heat exchange core 15 including a pluarlity of tubes extending between and connecting the inlet and outlet tanks and folded or corrugated heat exchange fins between the tubes allowing air to pass between the tubes but breaking the airstream up to enhance the heat exchange characteristics of the radiator. The inlet tank is also provided with an inlet neck closed by a pressure cap 16 and a conventional overflow tube (not shown) is connected to the neck to allow for overflow of the coolant in the radiator to the overflow reservoir. The radiator may be of the downflow type as shown or of the crossflow type.

As seen in FIGS. 1 and 2, a T-connector 17 is inserted into the inlet hose 12, either by sealingly fitting over the hose with an opening 18 in the hose communicating with the depending leg 19 of the connector or by inserting the connector into a break in the hose (not shown). The depending leg 19 receives a container 21 for a corrosion inhibitor and seals around the upper end 22 of the container by screw threads 23 (see FIG. 2) or by an exterior clamp (not shown). The T-connector is equally adapted to be located in the outlet hose 14.

Within the container 21 there is placed a can filled with a corrosion inhibitor charge. As shown in FIG. 3, can 24 comprises a drawn steel or aluminum body 25, closed at the bottom and open at the top end. The top or open end of the can is covered with a sheet of material 26 substantially identical to the radiator material requiring corrosion protection. The top material, or metal top, is scored as at 27 or knurled to provide lines or bands of material that are thinner than the sheet stock for the top, and top is secured to the body by a flange at 28. The can is filled with corrosion inhibitor charge 29.

The engine coolant is preferably a 50-50 mixture of ethylene glycol and water with a corrosion inhibitor in the ethylene glycol as supplied to the vehicle owner. This mixture is circulated from the radiator 10 by a fluid pump through the engine block for cooling. The coolant, heated from the engine block, is returned to the radiator for cooling by a forced air flow through the radiator core 15 around the tubes connecting the tanks 11 and 13. As the liquid passes through the inlet hose 12, it will contact the metal top 26 on the can 24. If a leak develops in the coolant system or a hose ruptures, the owner is likely to replace the coolant with water from any readily available source. This water obviously is not treated and is likely to be corrosive to the metal of the radiator.

As the metal top 26 is of substantially the same material as the radiator construction and is considerably thinner in the scored areas 27 than the material stock forming the radiator, the corrosive water will tend to attack the top as it passes through the hose 12, and the top would tend to corrode at the same or a faster rate than the radiator depending on the alloy composition. When penetration of the top is achieved, the coolant will enter the can. In order to dissolve a solid inhibitor and/or force the inhibitor into the coolant stream, corrosion of the top must progress beyond mere perforation to substantially destroy or weaken the top and open the can to a substantial intrusion of coolant.

The solid corrosion inhibitor charge 29 prepared according to the practice of this invention comprises layer 30, formed of a caustic compound, and layer 31, formed of at least one corrosion inhibiting compound.

In use, when the corrosive coolant penetrates the top and enters the can, sufficient alkaline or caustic material in layer 30 is dissolved by the coolant to form a strongly alkaline and highly corrosive solution. The top is quickly destroyed by the corrosive solution, allowing copious quantities of coolant to enter the can and rapidly effecting dissolution of the remaining solid inhibitor composition. Although the caustic or alkaline material is corrosive at high concentrations, when dispersed throughout the coolant system the corrosive effect is quickly dissipated.

It will be apparent to those skilled in the art that the corrosion inhibitor compositions of this invention may be readily adapted for use with any of a variety of corrodible devices for automatic addition of corrosion inhibitor. For example, where the device comprises a corrodible foil packet containing corrosion inhibitor adapted for insertion directly into the coolant system, the corrosion inhibitor charge will comprise a layered wafer having external surface layers composed of the caustic or alkaline compound and the internal layer formed of the corrosion inhibiting compound.

The invention will thus be seen to be a corrosion inhibitor composition for use with corrodible devices for the automatic addition of corrosion inhibitor to coolant systems, said corrosion inhibitor composition being a layered solid composition comprising a first or surface layer formed of a solid caustic compound selected from the group consisting of alkali and alkaline earth metal oxides, alkali and alkaline earth metal hydroxides, and alkaline salts thereof, and a second layer formed of at least one solid, water soluble corrosion inhibiting compound. Said corrosion inhibiting compound may be selected from any of the conventional corrosion inhibitors including soluble salts such as nitrates, nitrites, chromates, sulfates, silicates, phosphates, borates and arsenates, and thiazole compounds such as benzothiazole, tolylthiazole and mercaptobenzothiazole.

We claim:

1. In a device for automatic addition of corrosion inhibitor to a coolant system, said device comprising a container for corrosion inhibitor having at least a portion thereof formed of a corrodible metal foil positioned in the coolant system so that said corrodible metal foil is exposed to the coolant stream, the improvement wherein said corrosion inhibitor is a layered, solid, anhydrous composition comprising a surface layer formed of a caustic compound and a second layer formed of a corrosion inhibiting compound.

2. The corrosion inhibitor of claim 1 wherein said caustic compound is selected from the group consisting of alkali metal oxides, alkaline earth metal oxides, alkali metal hydroxides and alkaline earth metal hydroxides.

3. The corrosion inhibitor of claim 1 wherein said caustic compound is an alkaline salt of an alkali metal.

4. The corrosion inhibitor of claim 1 wherein said corrosion inhibiting compound is selected from the group consisting of soluble salts and thiazole compounds.

5. The corrosion inhibitor of claim 1 wherein the corrosion inhibiting compound is selected from the group consisting of the nitrates, nitrites, chromates, sulfates, silicates, phosphates, borates and arsenates of alkali metals.

* * * * *